United States Patent
Thompson (10) Patent No.: US 11,410,432 B2
(45) Date of Patent: Aug. 9, 2022

(54) METHODS AND SYSTEMS FOR DISPLAYING ANIMAL ENCOUNTER WARNINGS IN VEHICLES

(71) Applicant: Toyota Motor Engineering & Manufacturing North America, Inc., Plano, TX (US)

(72) Inventor: Derek A. Thompson, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 15 days.

(21) Appl. No.: 17/014,396

(22) Filed: Sep. 8, 2020

(65) Prior Publication Data
US 2022/0076034 A1 Mar. 10, 2022

(51) Int. Cl.
*G06V 20/58* (2022.01)
*B60W 50/14* (2020.01)
(Continued)

(52) U.S. Cl.
CPC ............ *G06V 20/582* (2022.01); *B60K 35/00* (2013.01); *B60R 11/04* (2013.01);
(Continued)

(58) Field of Classification Search
CPC ........... G06K 9/00805; G06K 9/00818; B60K 35/00; B60K 2370/178; B60R 11/04;
(Continued)

(56) References Cited

U.S. PATENT DOCUMENTS 7,098,775 B2 8/2006 Perlo
9,511,730 B1 * 12/2016 Wu .................... G06K 9/00845
(Continued)

FOREIGN PATENT DOCUMENTS

JP 2009204570 A 9/2009

OTHER PUBLICATIONS

Vennan Sibanda, et al.; "Design of an animal detection system for motor vehicle drivers"; 29th CIRP Design 2019; (https://www.sciencedirect.com/science/article/pii/S2212827119307978); pp. 755-760; 2019.
(Continued)

*Primary Examiner* — Nathnael Aynalem
(74) *Attorney, Agent, or Firm* — Dinsmore & Shohl LLP (57) ABSTRACT

A method of displaying a message associated with a likelihood of an animal appearing within a proximity of vehicle is provided. The method includes detecting, using a sensor of a vehicle, an animal warning sign in an area external to the vehicle at a particular time. The method further includes accessing in real time, using a computing device, a database including data associated with the animal depicted on the animal warning sign, determining in real time, using the computing device of the vehicle, a likelihood of the animal appearing within a proximity of the vehicle based on the accessed data, and displaying in real time, on a user interface associated with the computing device of the vehicle, a message based on the likelihood of the animal appearing within the proximity of the vehicle.

12 Claims, 3 Drawing Sheets

(51) Int. Cl.
*B60W 30/095* (2012.01)
*B60R 11/04* (2006.01)
*B60K 35/00* (2006.01)

(52) U.S. Cl.
CPC ........ *B60W 30/0956* (2013.01); *B60W 50/14* (2013.01); *B60K 2370/178* (2019.05); *B60R 2300/8093* (2013.01); *B60W 2050/143* (2013.01); *B60W 2050/146* (2013.01); *B60W 2556/10* (2020.02)

(58) Field of Classification Search
CPC ...... B60R 2300/8093; B60W 30/0956; B60W 50/14; B60W 2050/143; B60W 2050/146; B60W 2556/10; G06V 20/58; G06V 20/582; G06V 20/584; G06V 20/588; G06V 20/586; G06V 40/10; G08G 1/166; G08G 1/095; G08G 1/0962; G08G 1/09623; G08G 1/16; B60Q 2300/45; B60Q 9/008
See application file for complete search history.

(56) References Cited

U.S. PATENT DOCUMENTS

| | | | |
|---|---|---|---|
| 9,849,876 B2 | 12/2017 | Yoshio | |
| 10,152,649 B2 | 12/2018 | Shambik | |
| 10,417,914 B1 | 9/2019 | Vose | |
| 10,501,074 B2 | 12/2019 | Meier | |
| 2014/0074359 A1 | 3/2014 | Lane | |
| 2016/0280135 A1 | 9/2016 | Aubert et al. | |
| 2017/0024618 A1* | 1/2017 | Morales Teraoka | ........................ G06K 9/00362 |
| 2018/0354505 A1* | 12/2018 | Meier | ............... B60W 30/0956 |
| 2020/0293035 A1* | 9/2020 | Sakurada | ............. G05D 1/0246 |
| 2021/0164177 A1* | 6/2021 | Wientjes | ................. E01F 9/615 |

OTHER PUBLICATIONS

Khaled Saleh, et al.; "Effective vehicle-based kangaroo detection for collision warning systems using region-based convolutional networks"; MDPI; Jun. 2018; (https://www.ncbi.nlm.nih.gov/pmc/articles/PMC6022154/); 18 pgs.

* cited by examiner

METHODS AND SYSTEMS FOR DISPLAYING ANIMAL ENCOUNTER WARNINGS IN VEHICLES

TECHNICAL FIELD

The present specification relates to systems and methods for determining a likelihood of an animal appearing within a proximity of the vehicle, and more specifically, to systems and method of displaying a message on a display of a vehicle based on the determined likelihood.

BACKGROUND

Conventionally, animal warning signs are positioned on sides of roads. These warning signs are rectangular or diamond shaped structures on which images of one or more animals may be painted, for example, a deer crossing the highway, a group of bears walking, and so forth. Additionally, these warning signs may include textual warnings such as, for example, "Deer Xing", "Bear Crossing", and so forth. Drivers that see such signs are only generally aware of the possibility of encountering animals. However, drivers may need to be made more aware of such animals when the probability of encountering the animals is higher. For example, some animals are more likely to be proximate the road during a certain time of day, or a certain time of year. Accordingly, there may be a need to provide additional warning to drivers regarding the possibility of encountering animals.

SUMMARY

In one embodiment, a method of determining a likelihood of an animal appearing within a proximity of the vehicle and displaying a message on a user interface on a display of a vehicle based on the determined likelihood. The method includes detecting, using a sensor of a vehicle, an animal warning sign in an area external to the vehicle at a particular time. The method further includes accessing in real time, using a computing device of the vehicle, data associated with an animal depicted on the animal warning sign from a database. The method also includes determining in real time, using the computing device of the vehicle, a likelihood of the animal appearing within a proximity of the vehicle based on the accessed data, and displaying in real time, on a user interface associated with the computing device of the vehicle, a message based on the likelihood of the animal appearing within the proximity of the vehicle.

In another embodiment, an animal warning system implemented as part of a vehicle is provided. The system includes a sensor, one or more processors, and one or more non-transitory memory modules communicatively coupled to the one or more processors and storing machine-readable instructions that, when executed, cause the one or more processors to detect in real time, using the sensor, an animal warning sign in an area external to the vehicle at a particular time. In addition, the machine-readable instructions, when executed, further cause the one or more processors to access, in real time, data associated with an animal depicted on the animal warning sign from a database, determine, in real time, the likelihood of the animal appearing within a proximity of the vehicle based on the accessed data, and display in real time, on a user interface associated with the computing of the vehicle, a message based on the likelihood of the animal appearing within the proximity of the vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Conventionally, animal warning signs on roadways have limited utility. These signs serve as markers that only generally warn drivers of the possibility of the animals depicted in these warnings appearing within a vicinity of these signs. Such signs do not take into account data related to seasonal variations, hibernations patterns, and so forth, and the effect of such data on the likelihood of animals appearing within a proximity of the warning signs and/or vehicles that travel near these signs. Embodiments of the present disclosure access such data, and provide advanced warnings to drivers when the data suggests such advanced warnings are warranted.

Figure 1:
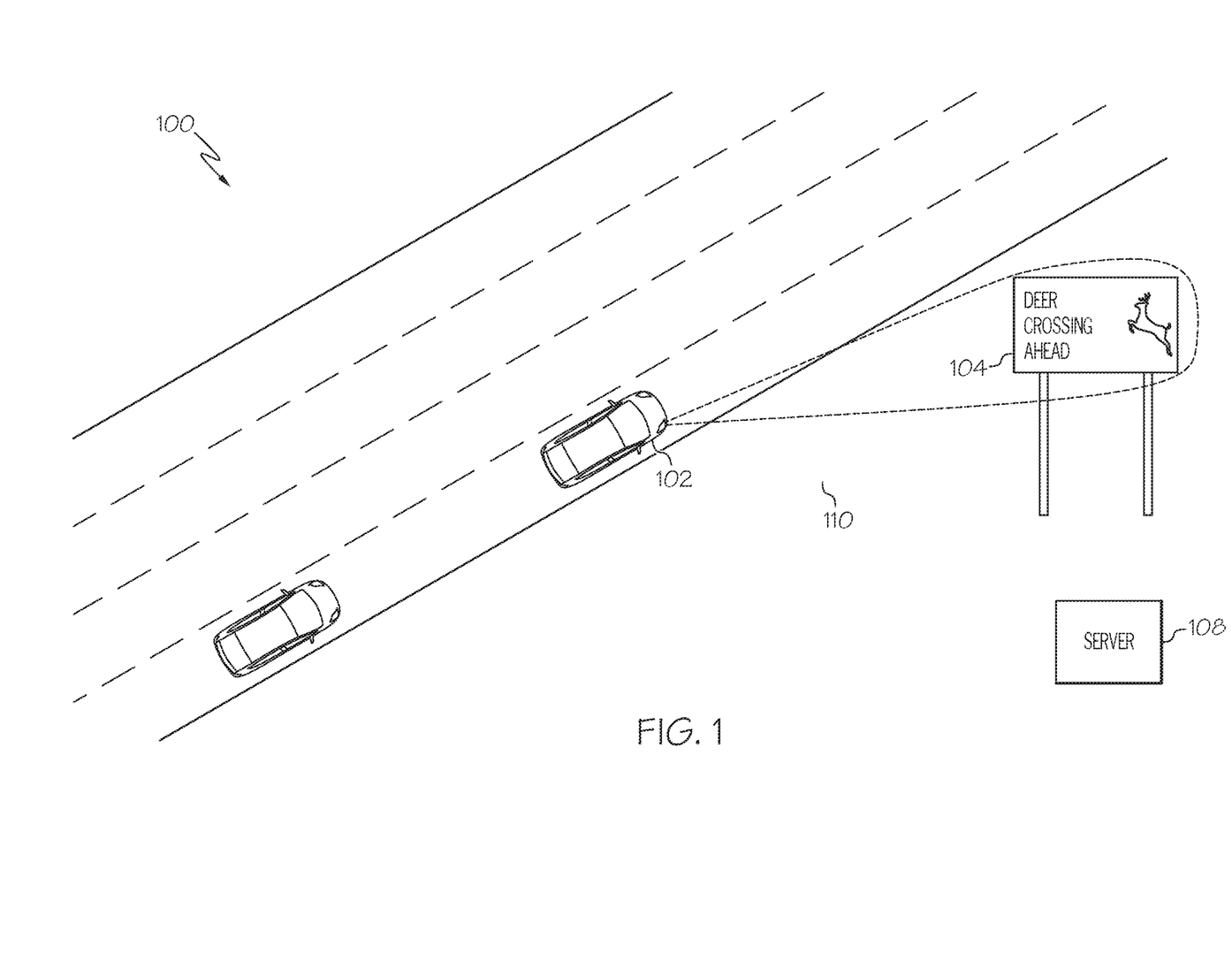
FIG. 1 schematically depicts an operation of the animal warning system, according to one or more embodiments herein.

FIG. 1 schematically depicts an operation of the animal warning system, according to one or more embodiments described herein.

In particular, FIG. 1 depicts an animal warning system 100 including a vehicle, an animal warning sign 104, and a cloud server 108. As depicted, the vehicle 102 is moving on a roadway and approaching the animal warning sign 104 located on the side of the roadway. In embodiments, the vehicle 102 may be an automobile that is driven by an individual, or any other passenger or non-passenger vehicle such as, for example, a terrestrial, aquatic, and/or airborne vehicle. In some embodiments, the vehicle 102 may be an autonomous vehicle that navigates its environment with limited human input or without human input. In another embodiment, the vehicles 102, 106 may be an unmanned aerial vehicle (UAV), commonly known as a drone. Other types of vehicles are also contemplated.

As depicted, when the vehicle 102 is within a certain proximity of the animal warning sign 104, one or more sensors of the vehicle 102 may detect the animal warning sign 104 depicted on the side of the roadway. In embodiments, the one or more sensors, imaging sensors (e.g, cameras) for example, may capture one or more images of the animal warning sign 104 from a certain distance away from the vehicle 102. In embodiments, depending on the existence of a direct line of sight between the animal warning sign 104 and the vehicle 102, the one or more imaging sensors may be able to capture the images from, for example, a range of 150 feet to 500 feet. The captured images may be communicated by the vehicle 102 to the cloud server 108 via a wireless network 110. In response, the cloud server 108 may communicate information back to the vehicle 102, which may then be used to display a warning associated with one or more objects (for example, one or more animals) included in the image depicted on the animal warning sign 104. Alternatively or additionally, the one or more processors in the vehicle may access data stored in the cloud server 108, and based on the accessing, determine a likelihood of one or more animals depicted in the animal warning sign 104 appearing in front of or near a certain distance of the vehicle 102, and display a warning based on the determined likelihood. In yet other embodiments, the one or more processors in the vehicle may access data stored entirely within memory that part of the hardware of the vehicle. In such embodiments, the vehicle 102 may not need access data stored in the cloud server 108, as all of the necessary and pertinent data is available in the memory that is part of the vehicle and is accessible via the vehicle's one or more processors.

In embodiments, the warning may be output on a display installed within the vehicle 102 or output via a speaker of the vehicle 102.

Figure 2:
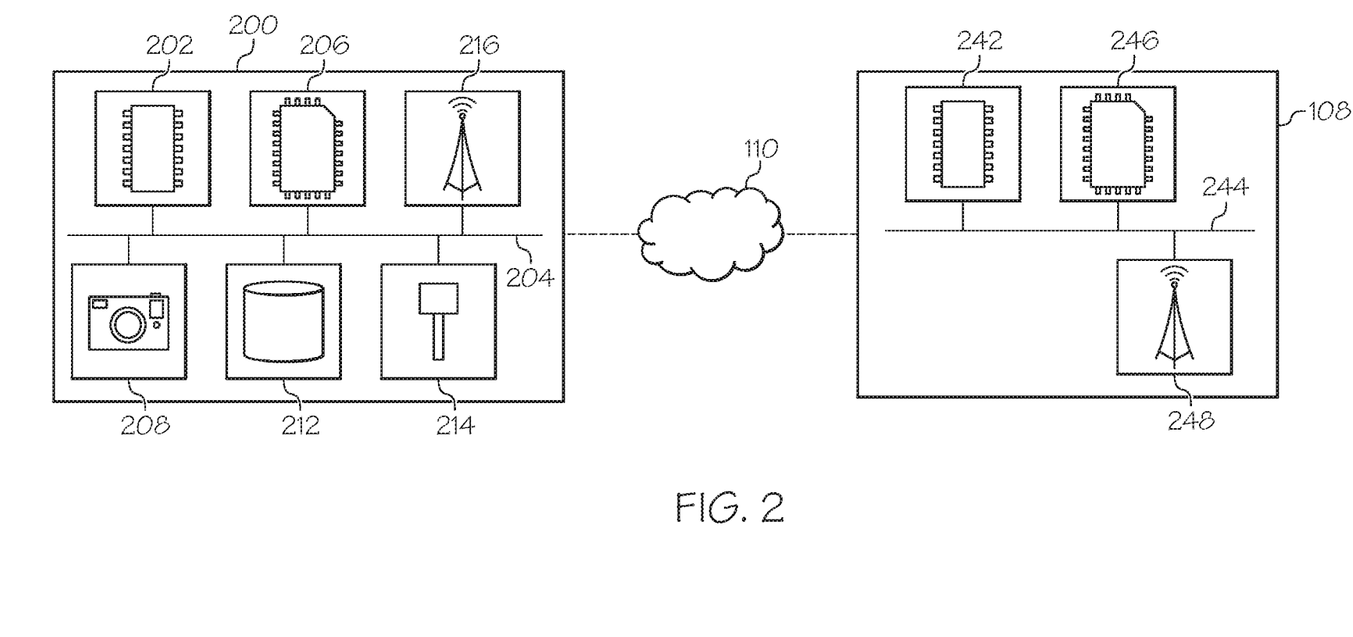
FIG. 2 schematically depicts non-limiting exemplary components of an animal warning system described herein that is built into various types of vehicles, and is communicatively coupled with a cloud server via a wireless network, according to one or more embodiments herein.

FIG. 2 schematically depicts non-limiting exemplary components of the example vehicle 102 of the animal warning system 100 described herein, which are communicatively coupled to the cloud server 108 via the wireless network 110, according to one or more embodiments herein. While the vehicle system 200 is depicted in isolation in FIG. 2, the vehicle system 200 may be included within a vehicle in some embodiments. For example, in embodiments, the vehicle system 200 may be included within the vehicle 102.

In embodiments, the vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 2, the vehicle system 200 also includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, the vehicle system 200 includes one or more sensors 208 may be any device having an array of sensing devices capable of detecting radiation in an ultraviolet wavelength band, a visible light wavelength band, or an infrared wavelength band. The one or more sensors 208 may have any resolution. In embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. The image data may include real time image data, live video stream data, and the like. The one or more sensors 208 may also include high definition cameras, standard definition cameras, and so forth.

In other embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. Ranging sensors like radar may be used to obtain a rough depth and speed information for the view of the vehicle system 200.

In operation, the one or more sensors 208 capture image data (for example, one or more images of the animal warning sign 104) and communicate these images to the one or more processors 202 and/or to other systems communicatively coupled to the communication path 204. The image data may be received by the one or more processors 202, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms. For example, in embodiments, the one or more images captured of the animal warning sign 104 may be digitally processed (e.g., by the one or more processors 202) such that the image of the object (e.g., the deer in the animal warning sign 104) may be separated from or identified separately from the text that states "Deer Crossing Ahead"). Other variations on this operation are also contemplated.

Still referring to FIG. 2, the vehicle system 200 may include a satellite antenna 214 coupled to the communication path 204 such that the communication path 204 communicatively couples the satellite antenna 214 to other modules of the vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

Still referring to FIG. 2, the vehicle system 200 may also include one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. Additionally, the one or more vehicle sensors 212 may include audio sensors that are capable of detecting various sounds, ambient noises, and the like within a predetermined proximity of the vehicle.

Still referring to FIG. 2, the vehicle system 200 also includes network interface hardware 216 for communicatively coupling the vehicle system 200 to the cloud server 108. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may be configured as part of a data communication module (DCM) and include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol.

Still referring to FIG. 2, the vehicle system 200 may be communicatively coupled to the cloud server 108 via the wireless network 110. The wireless network 110 may include one or more computer networks (e.g., a personal area network, a local area network, or a wide area network), cellular networks, satellite networks and/or a global positioning system and combinations thereof. Accordingly, the vehicle system 200 can be communicatively coupled to the wireless network 110 via a wide area network, via a local area network, via a personal area network, via a cellular network, via a satellite network, etc. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

The cloud server 108 to which the vehicle system 200 is communicatively coupled includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204 in some embodiments.

Figure 3:
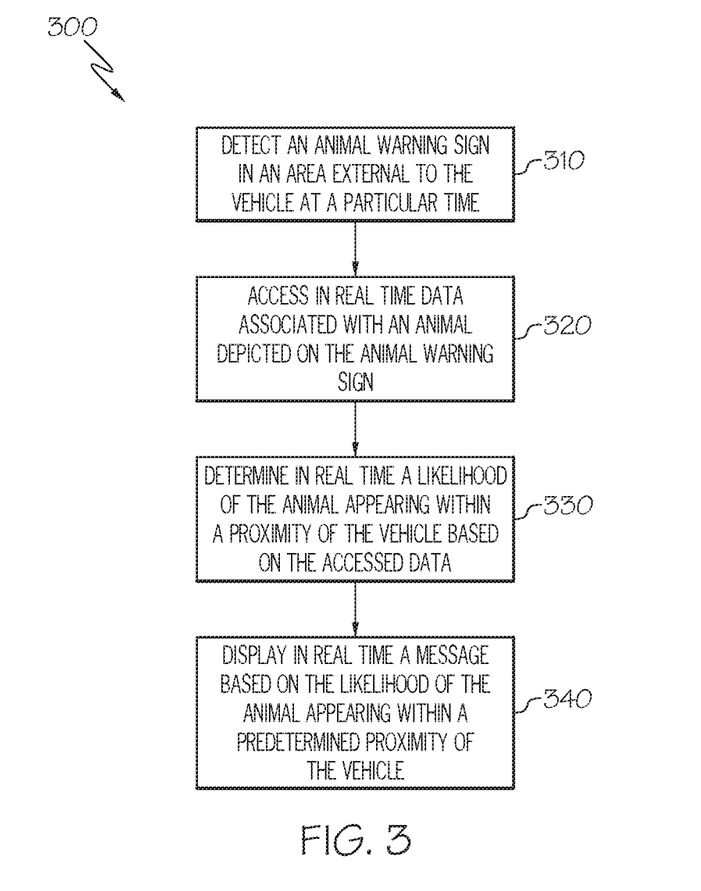
FIG. 3 schematically depicts a flowchart of the animal warning system, according to one or more embodiments herein.

FIG. 3 schematically depicts a flowchart of the animal warning system 100, according to one or more embodiments herein. A discussion of FIGS. 1 and 2 will be interspersed with the discussion of FIG. 3.

In step 310, the one or more sensors 208 of the vehicle system 200 that is included in the vehicle 102, may detect the animal warning sign 104 in an area external to the vehicle 102 at a particular time. In particular, as depicted in FIG. 1, the animal warning sign 104 is located on the side of the roadway on which the vehicle 102 is travelling. When the vehicle 102 is within a particular distance of the animal warning sign 104, the one or more sensors 208 (high definition cameras, for example) may be capture one or more images of the animal warning sign 104. The capabilities of the cameras and the existence of a direct line of sight will affect the distance from which the images may be captured. For example, the existence of a direct line sight due to a largely straight road may allow for the camera to capture the images from a distance of 500 feet. Alternatively, obstacles, winding roadways, and/or the like may only enable the sensors to capture, in embodiments, the one or more images from a distance of 150 feet. These are exemplary distances that may vary based on other various factors, and as such, other distances are also contemplated.

In embodiments, after capturing the images, the one or more processors 202 may perform a digital operation on the images to detect the content of the animal warning sign 104, such as extracting the object of the deer from the image and generating an image of the deer, and generating a separate image of the text that reads "Deer Crossing Ahead". Thereafter, the one or more processors 202 may instruct the network interface hardware 216 to communicate the content included as part of these images, via the wireless network 110, to the cloud server 108. Alternatively, other embodiments, the one or more processors 202 may instruct the network interface hardware 216 to communicate these images to the cloud server 108 without performing any digital processing operations. In these embodiments, the cloud server 108 may perform the digital processing operations for object detection and context extraction.

In step 320, the one or more processors 202 of the vehicle system 200 may access in real time, data associated with an animal depicted in the animal warning sign 104 (e.g., the deer) in a database (the data that is stored, for example, in the one or more memory modules 246 of the cloud server 108 or some other remote data storage device). In embodiments, the database may be the sole repository of all of the information relating to the animal (e.g., the deer) depicted on the animal warning sign 104. Alternatively or additionally, the database may be coupled, via the wireless network 110, with a plurality of other publically available databases such that information from all of these additional databases are also accessible. In embodiments, such databases may be associated with public libraries, government organizations, national and state parks, and/or the like. Alternatively or additionally, in embodiments, the database (included, for example, in the one or more memory modules 246) may be coupled to a plurality of proprietary databases that require some form of a licensing arrangement or a one-time fee payment for access.

The data stored in these databases relates to or describes various characteristics of animals (for example, the deer depicted in the animal warning sign 104), including how variations in seasons affect the travel patterns of these animals, periods of hibernation, length of stay in a particular location, and/or the like. The data may also include significant information relating to the presence or absence of animals in and around geographic areas within a certain proximity of the roadways, the frequency with which animals may loiter around, cross, or walk near these roadways, and/or the like. In embodiments, such information may be gathered using, for example, roadside cameras installed in or near the animal warning sign 104 (among other places). Additionally, such information may also be available in the databases of insurance companies, and other organizations, which may track information relating to collisions with animals on the roadway or accidents caused due to animals. In yet other embodiments, the database may be automatically generated and updated with data tracking the sightings of or encounters with animals within a certain geographic area of the animal warning sign 104. These sightings may be based on images that are automatically captured by one or more cameras of other vehicles that may have previously travelled past the animal warning sign 104 and encountered one or more of the animals depicted in the animal warning sign 104. These sightings may vary geographically and may have occurred, for example, a half a mile or one mile away from the animal warning sign 104. Such sightings may be tracked and stored as part of the database (included, for example, in the one or more memory modules 246) of the cloud server 108.

In step 330, the one or more processors 202 of the vehicle system 200, which may be included in the vehicle 102, may determine in real time a likelihood of the animal depicted in the animal warning sign 104 appearing within a proximity of the vehicle 102 based on the accessed data. In embodiments, the one or more processors 202 may analyze the data accessed from one or more of the plurality of databases described above, namely data relating to, for example, the number of times a deer may have appeared within a half a mile or one mile of the animal warning sign 104 historically, the hibernation and movement patterns of the animals, and the effect of seasons on these animals during a date and time (historically) that is comparable to the date and time at which the vehicle 102 may approach the animal warning sign 104. Alternatively or additionally, the instances of accidents or collisions between vehicles and one or more animals within a certain geographic area of the animal warning sign 104 may also be analyzed.

For example, if vehicle 102 approaches or passes the animal warning sign 104 at 2:30 PM on October 21, the one or more processors 202 of the vehicle system 200 included in the vehicle 102 record a time stamp associated with the time of 2:30 PM and the date of October 21. The one or more processors 202 may also determine, using the satellite antenna 214 (which may access GPS coordinates), a location of the vehicle 102 associated with the time stamp and a season of the year based on the date and the time stamp. The time stamp, date, season information, and location, combined with the one or more images captured of the animal warning sign 104 may then be cross referenced against data included in a plurality of databases (including one that is part of the cloud server 108) that are accessible, in real time, by the one or more processors 202 via the wireless network 110. The cross-referencing involves analyzing and comparing the location of the vehicle 102, the season at the particular time, with hibernation and travel patterns of the deer depicted in the animal warning sign 104, the effect of seasonal variations on the deer sightings within a certain proximity of the animal warning sign 104, the number of times a deer may have been involved in a collision, and/or the like. Alternatively or additionally, the instances of accidents or collisions between vehicles and one or more animals within a certain geographic area of the animal warning sign 104 may also be accessible (e.g., as part of proprietary databases of insurance companies) and analyzed therefrom. A plurality of other types of data may also be analyzed. Based on this analysis, the one or more processors 202 may identify or predict a travel or movement pattern for the animal depicted in the animal warning sign 104 within a proximity of the vehicle 102. Based on such analysis, the one or more processors 202 may determine the likelihood of the driver of the vehicle 102 encountering a deer within a certain geographic area of the vehicle 102 and/or the animal warning sign 104.

In step 340, the one or more processors 202 may display in real time, on a user interface (not shown) of the vehicle 102, a message based on the likelihood of the animal appearing within a proximity of the vehicle 102. In embodiments, the vehicle 102 may include a user interface that is output onto or accessible on a display that is built into the vehicle 102. In embodiments, the display of the vehicle 102 may be configured to output digital content such as high definition digital images, a live video stream, and so forth, in a 720 pixel or 1080 pixel display. Other types of displays are also contemplated. In embodiments, based on the determined likelihood of the animal appearing, a warning message may be output on the display, for example, "Caution: Deer in the Area", or "Deer Encounter Possible: Slow Down", and/or the like. Alternatively or additionally, such a warning may be output via the one or more speakers of the vehicle 102.

It should now be understood that certain embodiments described herein are directed to an animal warning system that includes a sensor, one or more processors, and one or more non-transitory memory modules communicatively coupled to the one or more processors and storing machine-readable instructions that, when executed, cause the one or more processors to detect in real time, using the sensor, an animal warning sign in an area external to the vehicle at a particular time. The one or more processors are further caused to, access, in real time, data associated with an animal depicted on the animal warning sign from a database, determine, in real time, a likelihood of the animal appearing within a proximity of the vehicle based on the accessed data, and displaying in real time, on a user interface associated with the computing device of the vehicle, a message based on the likelihood of the animal appearing within the proximity of the vehicle.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method comprising:
   detecting, using a sensor of a vehicle, an animal warning sign in an area external to the vehicle at a particular time;
   accessing in real time, using a computing device of the vehicle, data associated with an animal depicted on the animal warning sign from a database;
   determining in real time, using the computing device of the vehicle, a likelihood of the animal appearing within a proximity of the vehicle based on the accessing of the data;
   displaying in real time, on a user interface associated with the computing device of the vehicle, a message based on the likelihood of the animal appearing within the proximity of the vehicle;
   capturing, using the sensor of the vehicle, one or more images of an external object within a distance of the vehicle, wherein the external object is associated with the animal depicted in the animal warning sign; and
   automatically updating the database to include the one or more images of the external object.

2. The method of claim 1, wherein the sensor of the vehicle is a camera.

3. The method of claim 1, wherein the message displayed on the user interface is a warning based on the likelihood of the animal appearing within the proximity of the vehicle.

4. The method of claim 1, further comprising outputting, via a speaker of the vehicle, the message based on the likelihood of the animal appearing within the proximity of the vehicle.

5. The method of claim 1, wherein the determining in real time, using the computing device of the vehicle, the likelihood of the animal appearing within the proximity of the vehicle including:
   determining, by the computing device, a location of the vehicle;
   determining, by the computing device, a season based on the particular time at which the animal warning sign is detected by the sensor of the vehicle.

6. The method of claim 5, further comprising:
   comparing, by the computing device, the location of the vehicle and the season based on the particular time at which the animal warning sign is detected with the data associated with the animal depicted on the animal warning sign included in the database; and
   identifying based on the comparing, by the computing device, a movement pattern of the animal depicted on the animal warning sign relative to the proximity of the vehicle.

7. The method of claim 1, further comprising:
   detecting, using an additional sensor of an additional vehicle, the animal warning sign in the area external to the additional vehicle;
   accessing in real time from the database, using an additional computing device of the additional vehicle, additional data associated with the animal depicted on the animal warning sign, the additional data including the one or more images of the external object;
   determining in real time, using the additional computing device of the additional vehicle, an additional likelihood of the animal appearing within a distance of the additional vehicle based on the accessing of the additional data; and
   displaying in real time, on an additional user interface associated with the additional computing device of the additional vehicle, an additional message based on the additional likelihood of the animal appearing within the proximity of the additional vehicle.

8. An animal warning system implemented as part of a vehicle, the animal warning system comprising:
   a sensor;
   one or more processors; and
   one or more non-transitory memory modules communicatively coupled to the one or more processors and storing machine-readable instructions that, when executed, cause the one or more processors to:
     detect in real time, using the sensor, an animal warning sign in an area external to the vehicle at a particular time;
     access, in real time, data associated with an animal depicted on the animal warning sign from a database;

determine, in real time, a likelihood of the animal appearing within a proximity of the vehicle based the accessing of the data;

displaying in real time, on a user interface associated of the vehicle, a message based on the likelihood of the animal appearing within the proximity of the vehicle;

capture, using the sensor of the vehicle, one or more images of an external object within a distance of the vehicle, wherein the external object is associated with the animal depicted in the animal warning sign; and automatically update the database to include the one or more images of the external object.

9. The animal warning system of claim 8, wherein the sensor is a camera.

10. The animal warning system of claim 8, wherein the machine-readable instructions, when executed, further cause the one or more processors to determine the likelihood of the animal appearing within the proximity of the vehicle, in part, by:

determining a location of the vehicle; and determining a season based on the particular time at which the animal warning sign is detected by the sensor of the vehicle.

11. The animal warning system of claim 10, wherein the machine-readable instructions, when executed, further cause the one or more processors to:

compare the location of the vehicle and the season based on the particular time at which the animal warning sign is detected with the data associated with the animal depicted on the animal warning sign; and identify a movement pattern of the animal depicted on the animal warning sign relative to the proximity of the vehicle.

12. The animal warning system of claim 8, wherein the machine-readable instructions, when executed, further cause the one or more processors to:

detect, using an additional sensor of an additional vehicle, the animal warning sign in the area external to the additional vehicle;

access in real time from the database, using an additional computing device of the additional vehicle, additional data associated with the animal depicted on the animal warning sign, the additional data including the one or more images of the external object;

determine in real time, using the additional computing device of the additional vehicle, an additional likelihood of the animal appearing within a distance of the additional vehicle based on the accessing of the additional data; and display in real time, on an additional user interface associated with the additional computing device of the additional vehicle, an additional message based on the additional likelihood of the animal appearing within the proximity of the additional vehicle.

* * * * *